United States Patent
Kochiev

(10) Patent No.: US 12,034,221 B2
(45) Date of Patent: Jul. 9, 2024

(54) CPE DEVICE POSITIONING METHOD AND APPARATUS

(71) Applicant: T-Mobile Innovations LLC, Overland Park, KS (US)

(72) Inventor: Timur Kochiev, Irvine, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 49 days.

(21) Appl. No.: 17/989,402

(22) Filed: Nov. 17, 2022

(65) Prior Publication Data
US 2024/0170839 A1    May 23, 2024

(51) Int. Cl.
| | |
|---|---|
| H01Q 3/08 | (2006.01) |
| H01Q 1/22 | (2006.01) |
| H01Q 3/02 | (2006.01) |
| H04B 7/0404 | (2017.01) |
| H04B 7/10 | (2017.01) |
| H04B 17/309 | (2015.01) |

(52) U.S. Cl.
CPC ............ *H01Q 3/08* (2013.01); *H01Q 1/2291* (2013.01); *H04B 7/0404* (2013.01); *H04B 7/10* (2013.01); *H04B 17/309* (2015.01)

(58) Field of Classification Search
CPC ...... H01Q 3/08; H01Q 1/2291; H04B 7/0404; H04B 7/10; H04B 17/309
See application file for complete search history.

(56) References Cited

U.S. PATENT DOCUMENTS 11,482,768 B2 * 10/2022 Liu ..................... H01Q 3/04

OTHER PUBLICATIONS

Breitenstein et al. "The Secret to Fixed Wireless Access? Location, Location, Location" from https://www.bcg.com/publications/2022/secret-to-fixed-wireless-access accessed on Feb. 24, 2024 (Year: 2022).*

* cited by examiner

*Primary Examiner* — David S Huang
(74) *Attorney, Agent, or Firm* — Shook, Hardy & Bacon L.L.P.

(57) ABSTRACT

System and method for determining the best downlink and uplink speeds, and optimal latency for a customer premise equipment (CPE) device. A series of three-dimensional positions are measured with the downlink speed, uplink speed, and latency taken at each position. The optimal downlink and uplink speeds and latency are determined. A mmWave antenna is moved to the position that coincides with the optimal downlink and uplink speeds, and optical latency.

20 Claims, 8 Drawing Sheets

CPE DEVICE POSITIONING METHOD AND APPARATUS

CROSS-REFERENCE TO RELATED APPLICATIONS

None.

BACKGROUND

Because 5G is an umbrella term that covers a lot of different technologies, it is difficult to separate everything neatly without overlap. The higher speeds that really set 5G apart from any of the 4G LTE flavors require mmWave (millimeter wave) high-frequency bands. These high frequencies have very large bandwidths, so they are ideal for keeping everyone connected in busy environments like stadiums. Making this work efficiently depends on massive MIMO (multiple-input multiple-output) and beamforming. While 4G base stations might typically have 12 antennas to transmit and receive data, thanks to massive MIMO, 5G base stations might support hundreds of antennas. The thing about these higher mmWave frequencies is that they are much easier to block, and multiple antennas can lead to greater interference. Beamforming is employed to identify the optimum route to each connected user, which helps to reduce interference and boost the chances of easily blocked signals reaching their intended recipient.

Current state of the art mmWave beamforming methods assume a fixed grid of beams that are sent from the mmWave antennas. Beamforming only assumes handover between beams, and these methods do not include tracking of the device capable of connecting to a mmWave signal.

The position and orientation of devices become critical. This is because if a device is spatially located between the positions where adjacent beams have the maximum power or if its orientation is not optimal with respect to beam direction and polarization alignment, this device performance may degrade and not achieve and maintain the maximum data speeds in downlink and uplink directions. This is important for scenarios such as, but not limited to, Home Internet (HINT) and Fixed Wireless Access (FWA) applications where Customer Premise Equipment (CPE) devices are installed at customer locations to provide high speed internet service. Finding the optimal spatial position and orientation in all three Cartesian dimensions is not a trivial task and may even potentially affect customer satisfaction.

SUMMARY

A customer premise equipment (CPE) device may be installed with a configurable mount that can adjust CPE device spatial position and orientation in all three Cartesian dimensions. This configuration may also include a test procedure to verify that the best downlink and uplink speeds are achieved while the mount goes through a series of incremental position and orientation changes to fully cover all possible CPE device positions and orientations within a certain range. Such procedure can be automated by using methods and cloud solutions for testing downlink and uplink speeds and latency, using tools such as Ookla® by Ookla, LLC, and iPerf and iPerf3, which are open-source software. Procedures may include a series of tests at complete unobstructed line of sight, and/or behind a single/double pane window, a drywall, a wooden wall, or a concrete wall. At the end of the procedure, there will be a recommendation for the most optimal position and orientation. Such mount may be included with the CPE for fully automated deployment. Or, the mount may be exterior to the CPE.

BRIEF DESCRIPTION OF THE DRAWINGS

Illustrative embodiments of the present disclosure are described in detail below with reference to the attached drawing figures, and wherein.

DETAILED DESCRIPTION

Figure 1:
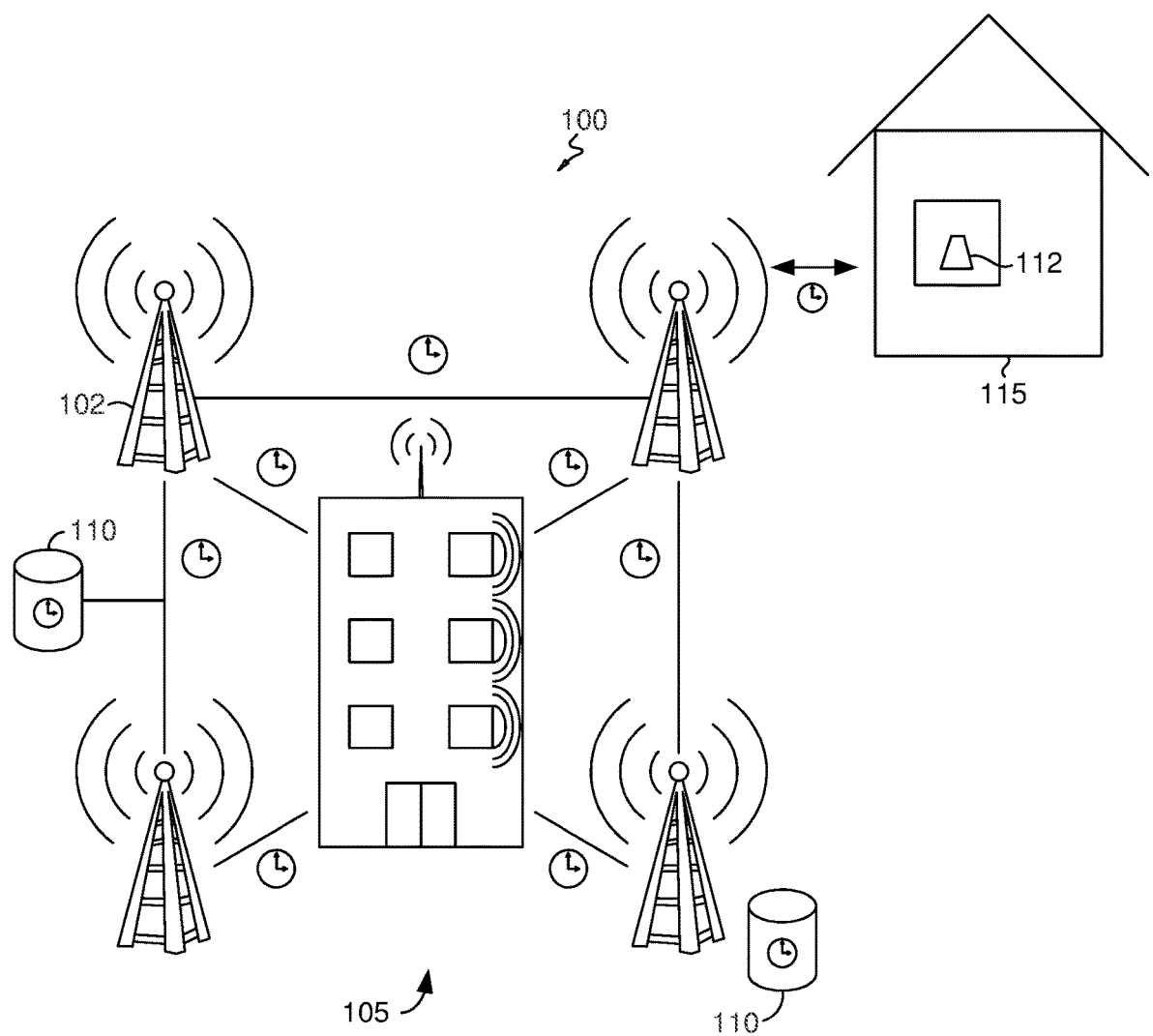
FIG. 1 illustrates an exemplary network with a mmWave system and customer premise equipment (CPE), according to an implementation of an embodiment of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 5GCN | 5G Core Network |
| BS | Base Station |

| | |
|---|---|
| CD-ROM | Compact Disk Read Only Memory |
| CPE | Customer Premise Equipment |
| DVD | Digital Versatile Discs |
| EEPROM | Electrically Erasable Programmable Read Only Memory |
| FWA | Fixed Wireless Access |
| gNB or gNodeB | Next Generation Node B |
| GPRS | General Packet Radio Service |
| GSM | Global System for Mobile communications |
| HINT | Home Internet |
| IP | Internet Protocol |
| LTE | Long Term Evolution |
| MD | Mobile Device |
| ME | Mobile Equipment |
| MIMO | Multiple-Input Multiple-Output |
| mmWave | Millimeter Wave |
| OS | Operating System |
| PC | Personal Computer |
| PCS | Personal Communications Service |
| RAM | Random Access Memory |
| RF | Radio-Frequency |
| RFI | Radio-Frequency Interference |
| ROM | Read Only Memory |
| TDMA | Time Division Multiple Access |
| UE | User Equipment |
| WCDMA | Wideband Code Division Multiple Access |
| WiMAX | Worldwide Interoperability for Microwave Access |

Further, various technical terms are used throughout this description.

Aspects herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include random access memory (RAM), read-only memory (ROM), electrically erasable programmable read-only memory (EEPROM), flash memory or other memory technology, compact disk read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage devices, or any other medium which may be used to store the desired information and which may be accessed by the computing device 800 shown in FIG. 8. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more nodes (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station," "node," and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

In a first aspect, a device is provided that includes mmWave antennas to establish a network connection via mmWave wireless links with base stations. mmWave customer premise equipment uses mmWave wireless links with base stations to provide network services to user devices within the customer premise where the mmWave customer premise equipment is located. Antenna positioning mechanisms physically move the mmWave antennas through a series of three-dimensional positions. A computer processor determines the downlink speed, the uplink speed, and latency of the mmWave wireless links for each of the series of three-dimensional positions.

In a second aspect, a method is provided that includes establishing, at a device, a network connection via mmWave wireless links between mmWave antennas and base stations. mmWave customer premise equipment uses the mmWave wireless links with the base stations to provide network services to user devices within the customer premise where the mmWave customer premise equipment is located. At the device, the mmWave antennas are physically moved through a series of three-dimensional positions. Using a computer processor, the downlink speed, the uplink speed, and latency of the mmWave wireless links are determined for each position of the series of three-dimensional positions. At the device, the mmWave antennas are physically moved to the physical position having the optimal downlink speed, uplink speed, and lowest latency of the mmWave wireless links between the mmWave antennas and the base stations.

In a third aspect, a method is provided that includes establishing, at a device, a network connection via mmWave wireless links between mmWave antennas and base stations. At the device, the mmWave antennas are moved through a series of three-dimensional positions. The downlink speed, the uplink speed, and latency of the mmWave wireless links are determined for each position of the series of three-dimensional positions using a computer processor. Using the computer processor, the position of the series of three-dimensional positions that satisfies an optimal position threshold is determined. Responsive to determining the position that satisfies the optimal threshold position, the mmWave antennas are moved to the optimal threshold position.

In FIG. 1, a network 100 is shown with a mmWave system 102 and consumer premise equipment (CPE) 112. Network 100 includes the mmWave system 105 with a set of mmWave antennas 102. The mmWave antennas 102 transmit signals in the form of beams, which can reach CPE 112 in a building 115. CPE 112 may include an antenna card, which can received the transmitted signals. Building 115 can be a residential building or commercial building or other type of building. CPE 112 is typically found in structures, such as building 115. The mmWave antennas 102 can be connected together through a device, such as a base station and can access data from databases, such as database 110.

Figure 2:
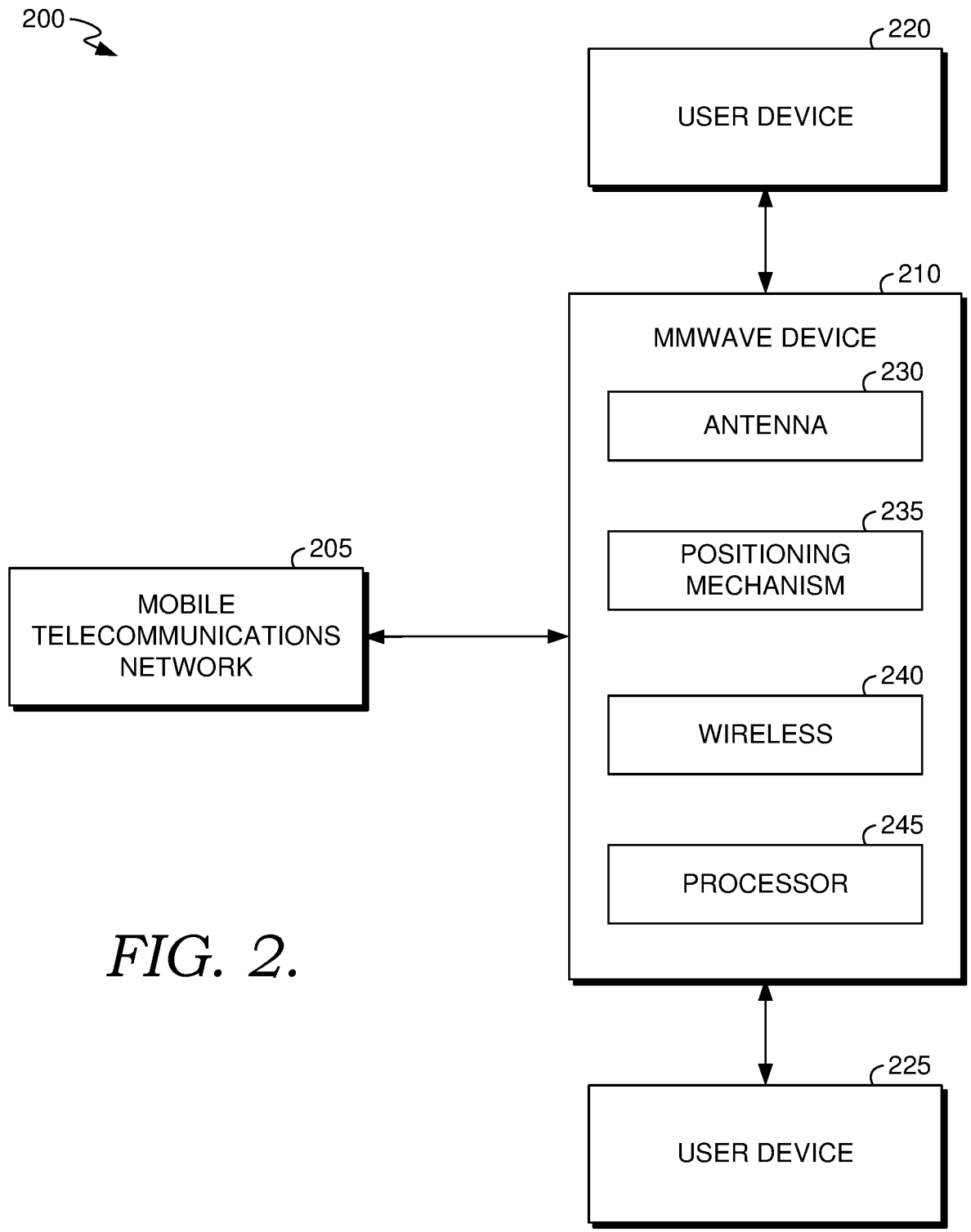
FIG. 2 illustrates an exemplary system diagram, according to an implementation of an embodiment of the present disclosure.

Turning now to FIG. 2, a system 200 is shown with a mobile telecommunication network 205 that communicates with a mmWave device 210. mmWave device 210 communicates with user devices 220 and 225. mmWave device 210 may include an antenna 230, a positioning mechanism 235, a wireless communicator 240, and a processor 245. User devices 220 and 225 and mmWave device 210 may be collectively called CPE. However, CPE can take on various forms. For example, CPE may include user device 220 and mmWave device 210.

Figure 3:
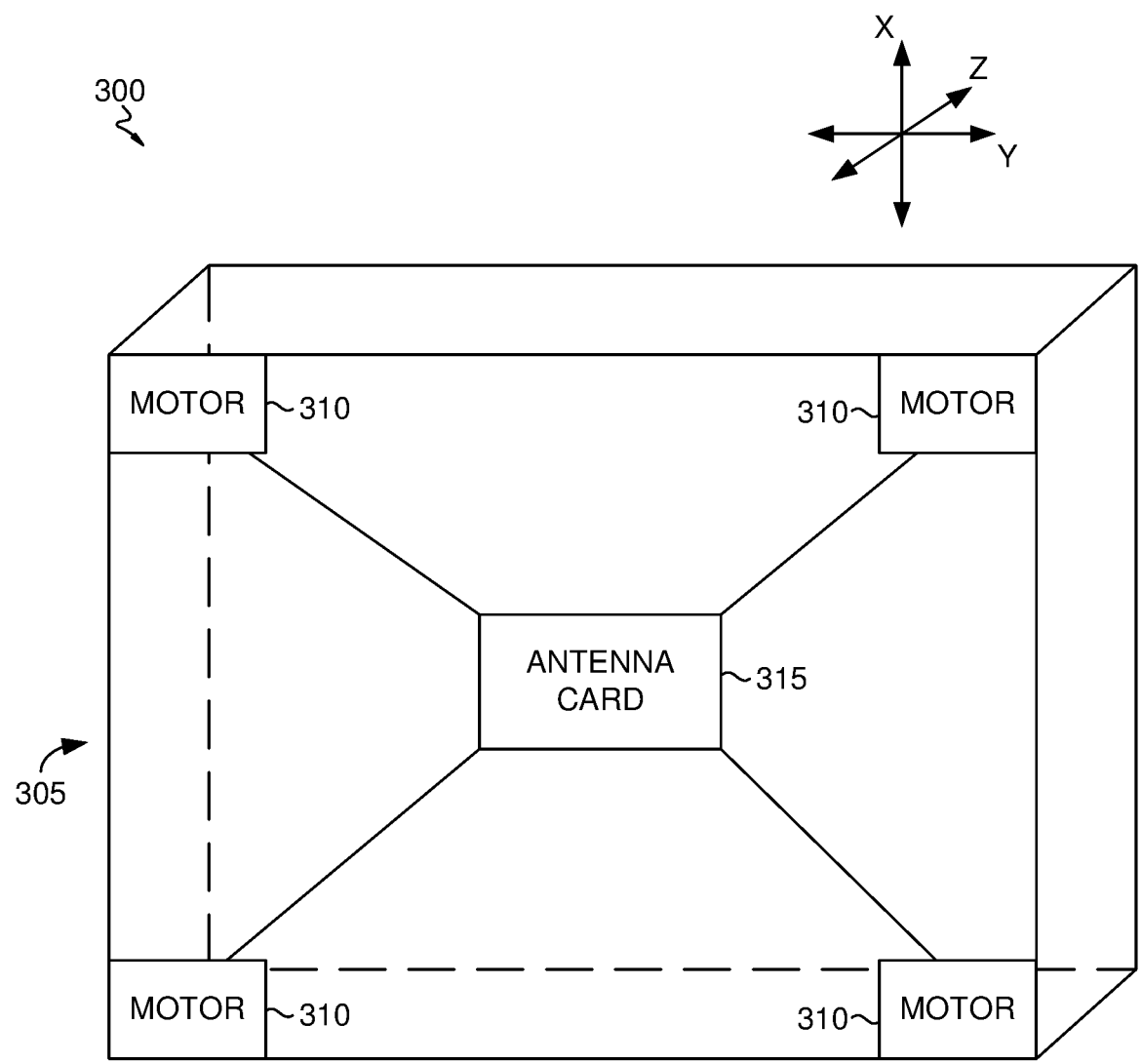
FIG. 3 illustrates an exemplary CPE with motorized system for positioning an antenna card, according to an implementation of an embodiment of the present disclosure.

In embodiments of the present disclosure, CPE 112 may include a mount that allows for it to be re-positioned or re-oriented automatically after a series of tests or diagnostics. For example, in FIG. 3 with a device 300, an exemplary CPE 305 may be the same as CPE 112, but also include a positioning system with one or more motors 310 for moving an antenna card 315. CPE 305 includes the components identified in FIG. 2. The antenna card 315 can move in various directions through a use of cables that are connected to motors 310. The antenna card 315 is moved to a position to provide the optimal spatial position and orientation to maximize downlink and uplink speeds and to reduce latency.

In some embodiments, the antenna card 315 may be located inside CPE 315. However, in other embodiments, the antenna card 315 may be located external to CPE 315 and move independently of CPE 315. Even yet, in another set of embodiments, motors 310 can be arranged where the entire CPE 315 moves in various directions to achieve optimal spatial position and orientation.

Figure 4:
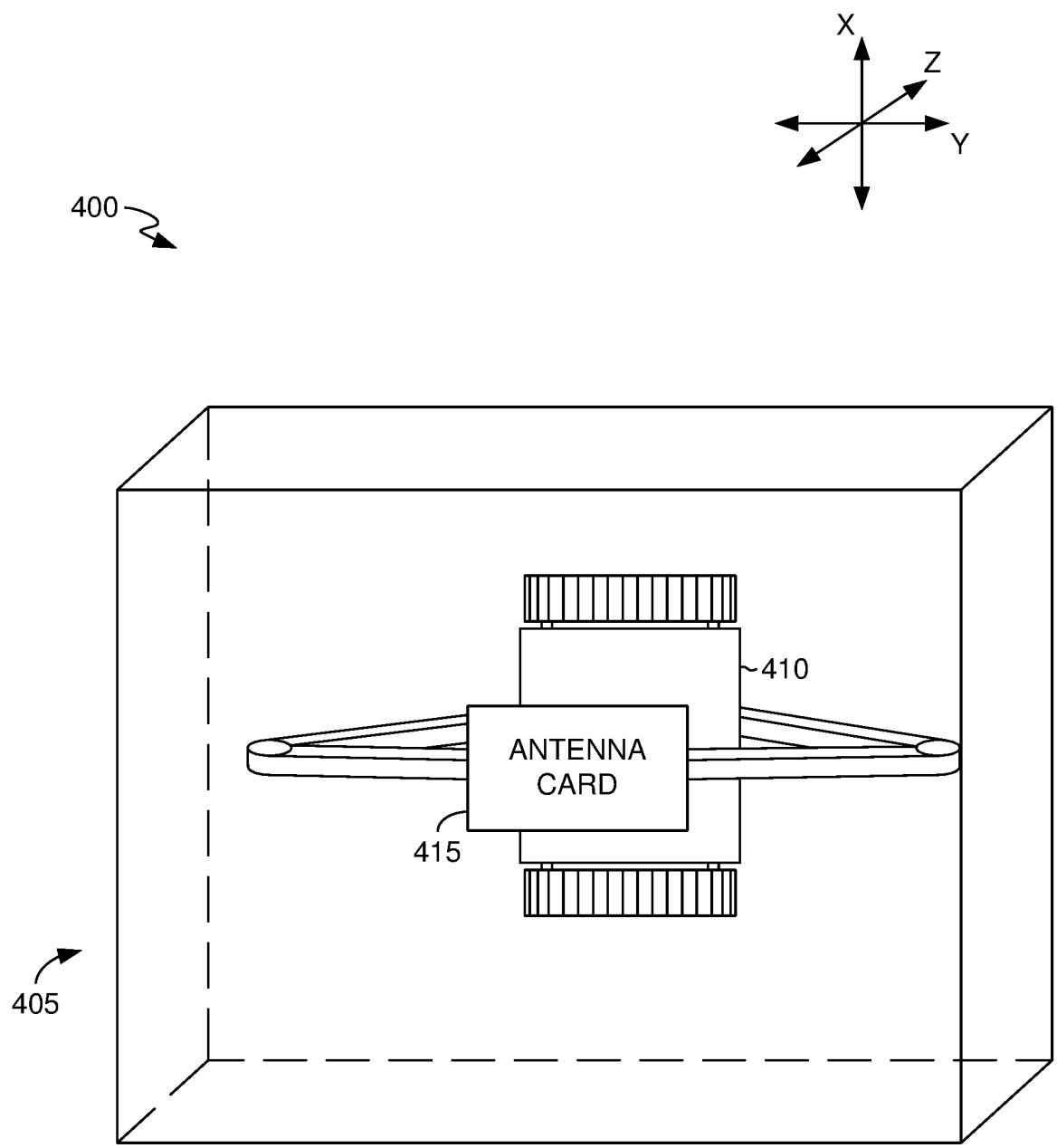
FIG. 4 illustrates another exemplary CPE with a swivel-type mount for positioning an antenna card, according to an implementation of an embodiment of the present disclosure.

Turning now to FIG. 4 with a device 400, a CPE 405 is similar to CPE 305. However, CPE 405 includes a mechanism 410, which allows an antenna card 415 to swivel or move about an axis. The antenna card 415 can be rotated or moved about to find the optimal spatial position and orientation to achieve the desired downlink and uplink speeds and the reduced latency. In embodiments, CPE 405 could include a swivel-type mount on movable tracks.

Figure 5:
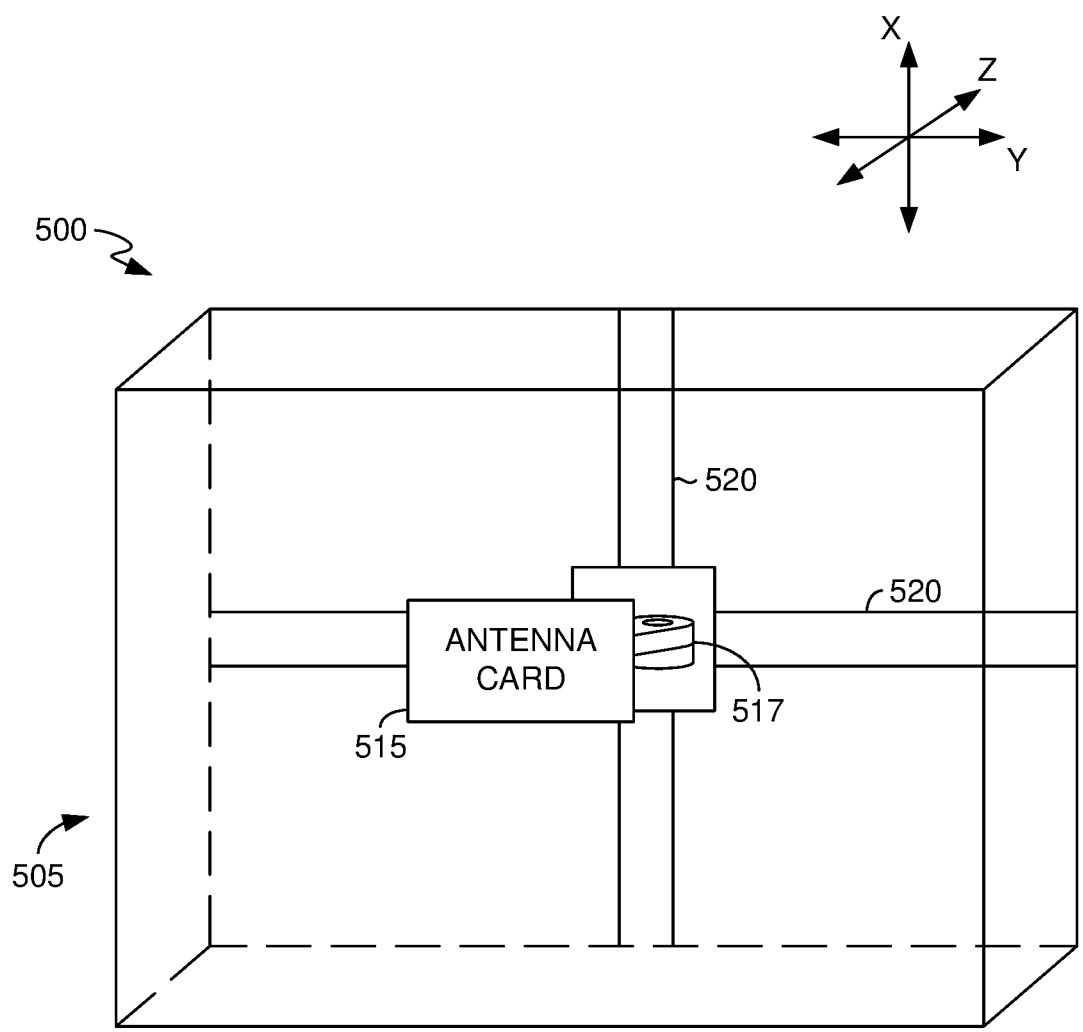
FIG. 5 illustrates yet another exemplary CPE with another swivel-type mount for positioning an antenna card, according to an implementation of an embodiment of the present disclosure.

In FIG. 5, a device 500 illustrates a CPE 505, which is similar to CPE 305 and CPE 405. However, CPE 505 includes an antenna card 515 that can swivel at mount 517 and can also move along a track system 520. The idea here is to illustrate that antenna card 515 (as well as antenna cards 315 and 415) can move in various directions to achieve optimal spatial position and orientation. From the optimal positioning, the antenna cards attempt to achieve the maximum uplink and downlink speeds while also reducing latency.

Figure 6:
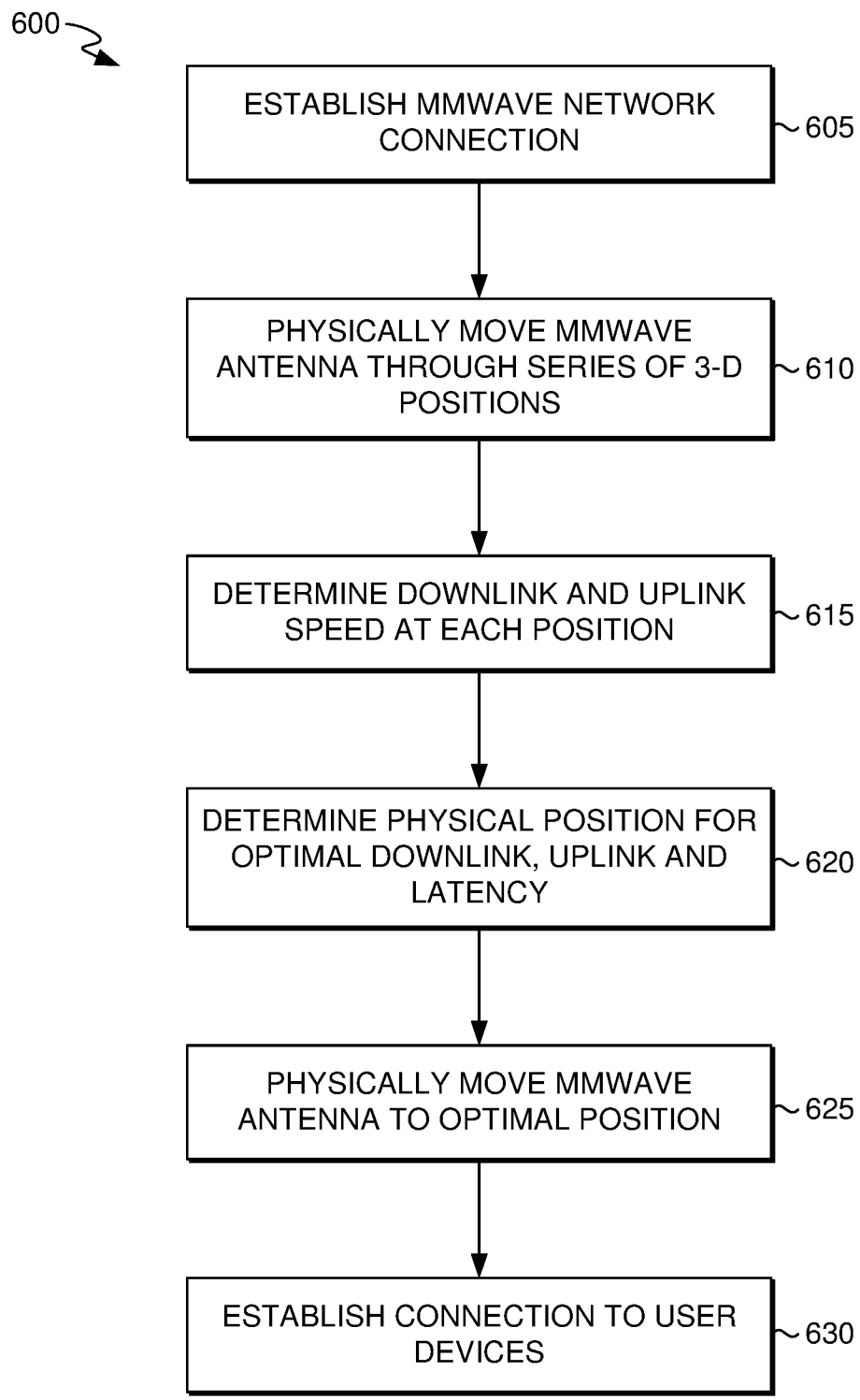
FIG. 6 illustrates a process for implementing a configurable mount for an exemplary CPE, according to an implementation of an embodiment of the present disclosure.

In FIG. 6, a process for implementing a configurable mount for a CPE device to achieve the best downlink and uplinks speeds is shown in a method 600. In a step 605, a mmWave network connection is established in a mmWave network 100. In a step 610, mmWave antenna (315, 415, or 515) is physically moved through a series of three-dimensional positions. The downlink and uplinks speeds at each position is determined, in a step 615. In a step 620, while determining the downlink and uplink speeds at each position, the physical position for the optimal downlink speed, uplink speed, and lowest latency is determined. In a step 625, the mmWave antenna (315, 415, or 515) is physically moved to an optimal position. With the mmWave antenna in the optimal position, a connection to user devices is established, in a step 630.

Figure 7:
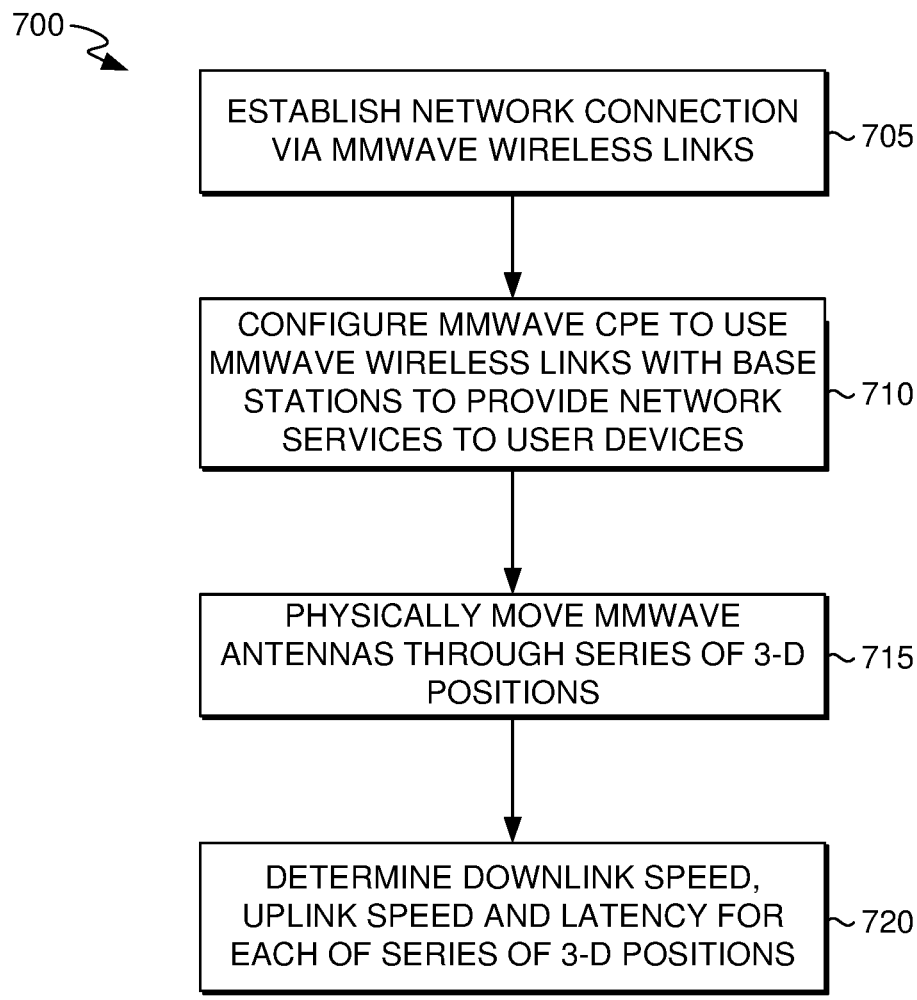
FIG. 7 illustrates another process implementing a configurable mount for an exemplary CPE, according to an implementation of an embodiment of the present disclosure.

Turning now to FIG. 7, another process for implementing a configurable mount for a CPE device to achieve the best downlink and uplinks speeds is shown in a method 700. In a step 705, mmWave antennas 102 establish a network connection by way of mmWave wireless links with base stations. A mmWave CPE is configured to use the mmWave wireless links with base stations to provide network services to user devices within the customer premise, in a step 710. In a step 715, antenna positioning mechanisms physically move the mmWave antennas through a series of three-dimensional positions. In a step 720, the downlink speed, the uplink speed, and latency of the mmWave wireless links are determined for each of the series of three-dimensional positions.

Figure 8:
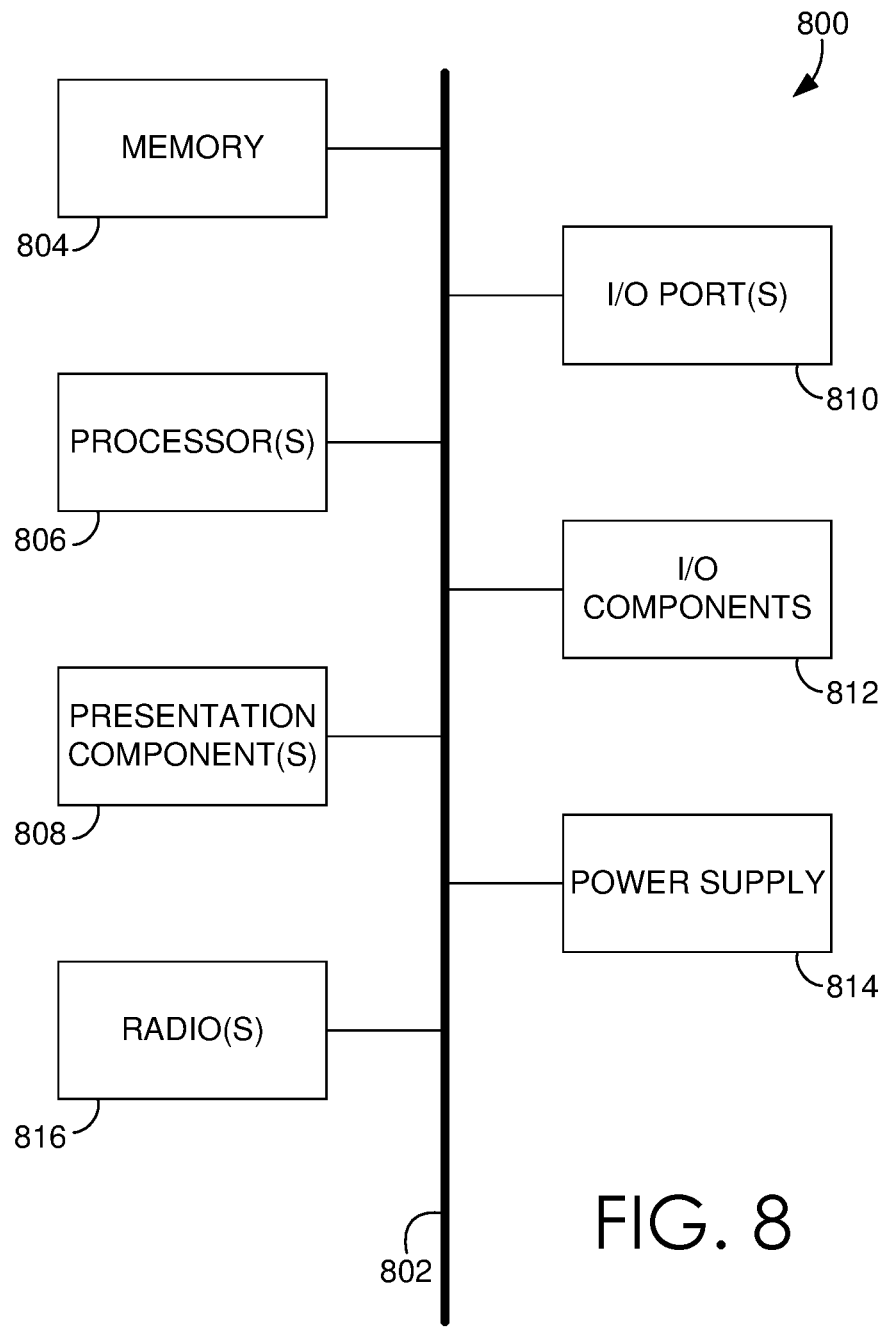
FIG. 8 depicts a diagram of an exemplary computing environment suitable for use in implementations of the present disclosure.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio(s) 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Through various embodiments, a telecommunications provider, implementing 5G technology, can implement mmWave technology to allow customer premise equipment to achieve maximum uplink and downlink speeds as well as reduced latency by adjusting the physical position of the antenna at the customer premise equipment. The customer premise equipment goes through a series of tests or diagnostics to determine the optimal position that can obtain the maximum speeds and lowest latency for the user device.

The invention claimed is:
1. A device comprising:
one or more mmWave antennas that establish a network connection via one or more mmWave wireless links with one or more base stations;
a mmWave customer premise equipment is configured to use the one or more mmWave wireless links with the one or more base stations to provide network services to one or more user devices within the customer premise, where the mmWave customer premise equipment is located;

one or more antenna positioning mechanisms physically move the one or more mmWave antennas through a series of three-dimensional positions; and a computer processor determines the downlink speed, the uplink speed and latency of the one or more mmWave wireless links for each of the series of three-dimensional positions.

2. The device of claim 1, further comprising:

a compartment for housing the one or more mmWave antennas, the mmWave customer premise equipment, the one or more antenna position mechanisms and the computer processor.

3. The device of claim 2, wherein the processor controls the one or more antenna positioning mechanisms and the three-dimensional position of the one or more mmWave antennas.

4. The device of claim 3, wherein the one or more antenna positioning mechanisms comprise a platform adapted to receive the one or more mmWave antennas.

5. The device of claim 4, wherein the processor causes the platform to move through the series of three-dimensional positions.

6. The device of claim 4, wherein the one or more antenna positioning mechanisms comprises at least two supporting ropes in communication with the platform through a series of pulleys.

7. The device of claim 6, wherein the at least two supporting ropes in communication with the platform relocate to move the platform in three-dimensional space.

8. The device of claim 7, wherein a first supporting rope controls X-axis motion of the platform and the second supporting rope controls Y-axis motion of the platform.

9. The device of claim 8, wherein the first supporting rope and the second supporting are relocated equal lengths to allow the Z-axis of the platform to be traversed.

10. The device of claim 1, wherein the one or more antenna positioning mechanisms position the one or more mmWave antennas to capture one or more mmWave beams to establish the one or more mmWave wireless links.

11. The device of claim 10, wherein the one or more antenna positioning mechanisms swivel about an axis the one or more mmWave antennas to find an optimal spatial position and orientation to achieve a desired downlink speed, desired uplink speed, and a reduced latency.

12. The device of claim 10, wherein the one or more antenna positioning mechanisms move along a track system the one or more mmWave antennas to find an optimal spatial position and orientation to achieve a desired downlink speed, desired uplink speed, and a reduced latency.

13. A method comprising:

establishing, at a device, a network connection via one or more mmWave wireless links between one or more mmWave antennas and one or more base stations, wherein mmWave customer premise equipment uses the one or more mmWave wireless links with the one or more base stations to provide network services to one or more user devices within the customer premise where the mmWave customer premise equipment is located;

physically moving, at a device, the one or more mmWave antennas through a series of three-dimensional positions;

determining, utilizing a computer processor, the downlink speed, the uplink speed and latency of the one or more mmWave wireless links for each position of the series of three-dimensional positions; and physically moving, at the device, the one or more mmWave antennas to the physical position having the optimal downlink speed, uplink speed and latency of the one or more mmWave wireless links between the one or more mmWave antennas and the one or more base stations.

14. The device of claim 13, wherein physically moving, at the device, the one or more mmWave antennas comprises operating at least two supporting ropes in communication with a platform through a series of pulleys, wherein the platform is adapted to receive the one or more mmWave antennas.

15. The device of claim 13, wherein physically moving, at the device, the one or more mmWave antennas comprises swiveling about an axis the one or more mmWave antennas to find an optimal spatial position and orientation to achieve a desired downlink speed, desired uplink speed, and a reduced latency.

16. The device of claim 13, wherein physically moving, at the device, the one or more mmWave antennas comprises moving along a track system the one or more mmWave antennas to find an optimal spatial position and orientation to achieve a desired downlink speed, desired uplink speed, and a reduced latency.

17. A method comprising:

establishing, at a device, a network connection via one or more mmWave wireless links between one or more mmWave antennas and one or more base stations;

physically moving, at a device, the one or more mmWave antennas through a series of three-dimensional positions;

determining, utilizing a computer processor, the downlink speed, the uplink speed and latency of the one or more mmWave wireless links for each position of the series of three-dimensional positions;

determining, utilizing a computer processor, the position of the series of three-dimensional positions that satisfies an optimal position threshold; and responsive to determining a position that satisfies the optimal threshold position, physically moving the one or more mmWave antennas to the optimal threshold position.

18. The method of claim 17, wherein responsive to moving the one or more mmWave antennas to the optimal threshold position, establishing a network connection via one or more mmWave wireless links between the one or more mmWave antennas and one or more base stations, wherein mmWave customer premise equipment uses the one or more mmWave wireless links with the one or more base stations to provide network services to one or more user devices within the customer premise where the mmWave customer premise equipment is located.

19. The device of claim 17, wherein physically moving the one or more mmWave antennas comprises swiveling about an axis the one or more mmWave antennas to find the optimal threshold position.

20. The device of claim 17, wherein physically moving the one or more mmWave antennas comprises moving along a track system the one or more mmWave antennas to find the optimal threshold position.

* * * * *